(12) United States Patent
Clarke et al.

(10) Patent No.: US 7,337,391 B2
(45) Date of Patent: Feb. 26, 2008

(54) METHOD AND SYSTEM FOR STYLESHEET EXECUTION INTERACTIVE FEEDBACK

(75) Inventors: Adam R. Clarke, Raleigh, NC (US); Danielle Madeleine Cusson, Raleigh, NC (US); Angel Luis Diaz, Carmel, NY (US); Douglas Charles Lovell, Garrison, NY (US); Kristoffer H. Rose, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 521 days.

(21) Appl. No.: 10/096,379

(22) Filed: Mar. 12, 2002

(65) Prior Publication Data
US 2003/0177441 A1    Sep. 18, 2003

(51) Int. Cl.
*G06F 15/00* (2006.01)
(52) U.S. Cl. .................................. 715/513; 715/500
(58) Field of Classification Search ............... 715/523, 715/784, 513; 709/231; 707/513, 3
See application file for complete search history.

(56) References Cited

U.S. PATENT DOCUMENTS

| | | | |
|---|---|---|---|
| 5,644,736 A * | 7/1997 | Healy et al. ................ | 715/784 |
| 5,926,806 A * | 7/1999 | Marshall et al. ............. | 707/3 |
| 6,502,112 B1 | 12/2002 | Baisley | |
| 6,643,652 B2 | 11/2003 | Helgeson et al. ............. | 701/10 |
| 6,678,867 B2* | 1/2004 | Fong et al. ................. | 715/523 |
| 6,772,165 B2 | 8/2004 | O'Carroll .................. | 707/101 |
| 6,845,380 B2 | 1/2005 | Su et al. | |
| 2001/0018696 A1* | 8/2001 | Hori et al. ................. | 707/513 |
| 2001/0032218 A1* | 10/2001 | Huang ...................... | 707/513 |
| 2002/0116516 A1* | 8/2002 | Pedersen et al. ............ | 709/231 |

FOREIGN PATENT DOCUMENTS

CA    WO 9414122    *    6/1994

OTHER PUBLICATIONS

IBM XSL Editor, Nov. 1999. available at <"http?//xml.coverpage.org/ibmXSLEditorAnn19991117.html">.*
Pietriga, "VXT: A Visual Approach to XML Transformations", ACM Press, 2001, pp. 1-10.
Villard, "Authoring Transformations by Direct Manipulation for Adaptable Multimedia Presentations", ACM Press, 2001, pp. 125-134.
Leslie, "Transforming documentation from the XML doctypes used for the apache website to DITA", Oct. 21, 2001, ACM Press, New York, pp. 157-164.
Becker, [xsl] merging XML documents <eom>, Jan. 31, 2001, pp. 1-2 http://www.xslt.com/html/xsl-list/2001-01/msq0153.html.

* cited by examiner

*Primary Examiner*—William L. Bashore
*Assistant Examiner*—Quoc A. Tran
(74) *Attorney, Agent, or Firm*—Duke W. Yee; Jeanine S. Ray; Gerald H. Glanzman

(57) ABSTRACT

A method (and structure) for displaying mapping relationships defined by a plurality of instruction elements, each instruction element providing a relation between zero or more source elements and zero or more result elements, where each source element includes one of a plurality of source elements and each result element includes one of a plurality of result elements, including providing a user a representation including a portion of the mapping relationships and including one or more of the plurality of source elements, the plurality of instruction elements, and the plurality of result elements. The user is provided a method to select one of the elements in the representation. The selected element is highlighted in the representation and the highlighting can be propagated to any other elements related by the mapping that are displayed in the representation.

5 Claims, 8 Drawing Sheets

METHOD AND SYSTEM FOR STYLESHEET EXECUTION INTERACTIVE FEEDBACK

CROSS REFERENCE TO RELATED APPLICATION

The present Application is related to the following co-pending applications:

U.S. patent application Ser. No. 10/095,827 filed on Mar. 12, 2002, to Adler et al., entitled "METHOD AND SYSTEM FOR STYLESHEET-CENTRIC EDITING";

U.S. patent application Ser. No. 10/095,797, filed on Mar. 12, 2002, to Adler et al., entitled "METHOD AND SYSTEM FOR STYLESHEET RULE CREATION, COMBINATION, AND REMOVAL TECHNOLOGY"; and U.S. patent application Ser. No. 10/095,737, filed on Mar. 12, 2002, to Adler et al., entitled "METHOD AND SYSTEM FOR COPY AND PASTE TECHNOLOGY FOR STYLESHEET EDITING", all assigned to the present assignee, and all incorporated herein by reference.

BACKGROUND OF THE INVENTION

1. Field of the Invention

The present invention relates generally to a method of displaying to a user the relationships between source, instruction, and result elements of a mapped function by highlighting interrelated elements. In an exemplary embodiment, an XSLT (eXtensible Style Language Transformations) stylesheet editor incorporates this highlighting method, thereby allowing a user to better understand how the rules within an XSLT stylesheet being edited will match input data and what output data the rules will provide.

2. Description of the Related Art

An XSLT (eXtensible Style Language Transformations) stylesheet consists of a set of rules that describes how to process elements found in an input XML (eXtensible Markup Language) document into an XML output document. Each rule matches one or more elements in the input document and describes the actions to take and the output to produce when a matching element is found. The result of processing all of the elements in the input document produces the output document.

Execution of an XSLT stylesheet is non-sequential. It is not like a program written in conventional programming languages such as C, C++, Java, Basic, FORTRAN, Cobol, etc. This non-sequential execution produces a barrier to IT professionals attempting to write and use it. It has a very different execution paradigm than those to which they are accustomed. This means that tools for understanding execution of an XSLT stylesheet can be very different than similar tools for sequential programming languages, such as "debuggers."

Specific to the present invention, in development of a XSLT stylesheet editor, one feature incorporated into the editor provides the means to trace and break execution of the stylesheet, analogous to that used in a standard debugger. The inventors realized that this method is not particularly useful in the tree-structure environment of XSLT since it provides a narrow window into the operation of the stylesheet.

SUMMARY OF THE INVENTION

In view of the foregoing problems, drawbacks, and disadvantages of the conventional systems, it is an object of the present invention to provide a structure (and method) in which a non-recursive transformation process such as an XSLT stylesheet execution is presented using a method of highlighting in a way that enhances the presentation of complex relationships. An exemplary embodiment of the present invention is the incorporation into an editor for processing an XSL or XSLT stylesheet.

It is, therefore, an object of the present invention to teach a structure and method for an improved display to a user working with any process in which a transformation mapping can be established between input elements and output elements.

It is another object of the present invention to teach a method in which multiple input elements are related to multiple output elements by one or more procedures.

It is another object of the present invention to teach a method in which highlighting can provide an indication of the relationship between source, result, and process elements.

It is another object of the present invention to teach a method in which highlighting can be propagated to show how an element selected by a user is related to a set of source, result, and process elements.

It is another object of the present invention to teach a method in which at least two levels of highlighting provide an indication of primary and secondary relationships.

It is another object of the present invention to teach this method as applied to pipelined transformations.

It is another object of the present invention to teach this method in a tree-structure environment in which highlighting takes on an explicit and implicit interpretation.

It is another object of the present invention to teach an exemplary embodiment of this improved method of displaying in an XSLT stylesheet editor.

In order to achieve the above goals and objectives, according to a first aspect of the present invention, described herein is a method (and a structure and a signal-bearing medium) for displaying mapping relationships defined by a plurality of instruction elements, each instruction element providing a relation between zero or more source elements and zero or more result elements, where each source element is one of a plurality of source elements and each result element is one of a plurality of result elements, including providing a user a representation comprising a portion of the mapping relationships and including one or more of the plurality of source elements, the plurality of instruction elements, and the plurality of result elements. The user is provided a method to select one of the elements in the representation. The selected element is highlighted in the representation and the highlighting can be propagated to any other elements related by the mapping that are displayed in the representation.

This XSLT stylesheet editor, as developed by the assignee, uses the present invention to provide greater feedback to the user. The invention presents a view of the full scope of a stylesheet rule—all of the matched nodes, all of the result nodes, as well as the stylesheet rule. That is, given a selection by the user of any of these nodes, this feature highlights the rule, the matched node, and the result node(s). This technique improves the understanding of the stylesheet and its effects during the editing process for the stylesheet. A fuller picture is provided in tree-structure environments such as XML and, more generally, in any non-recursive transformation process.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
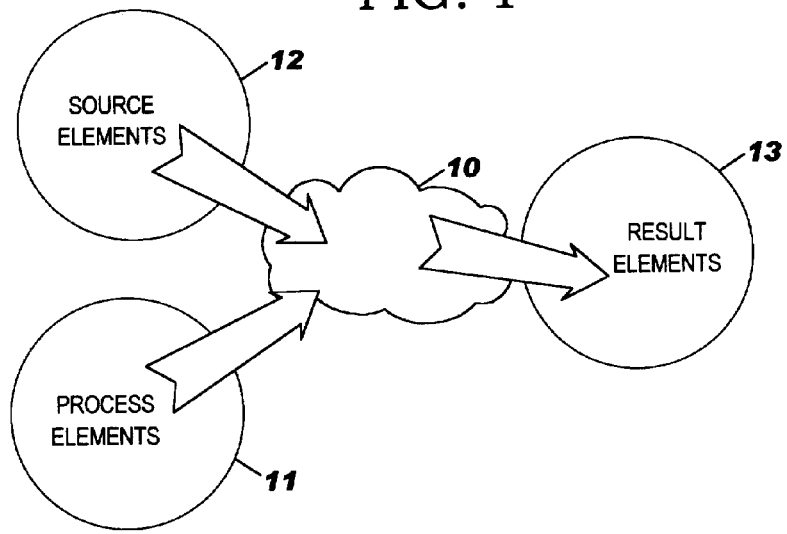
FIG. 1 shows the concept of a transformation between source elements and result elements by using process elements.
Figure 2:
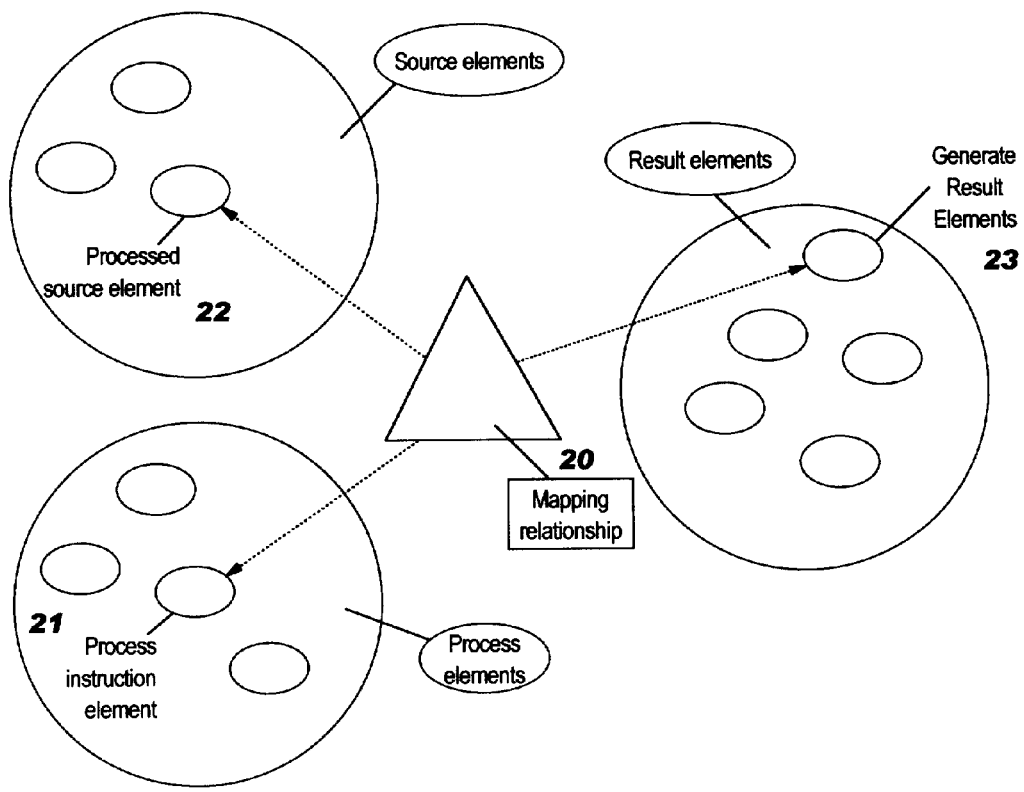
FIGS. 2 through 4 extend the concept of a process transformation to be a mapping relationship, including cases in which a single process instruction element is a basis for multiple mapping relationships.

Referring now to the drawings, and more particularly to FIG. 1, a preferred embodiment will now be described. FIG. 1 shows a process 10 that reads an input set 11 of instruction elements and an input set 12 of source elements to produce an output set 13 of result elements. The process 10 produces "mapping relationships" of instruction elements, source elements, and result elements, as illustrated by FIG. 2. The meaning of the mapping relationship is not relevant. It may be helpful, however, to consider, as a concrete example, that a mapping relationship 20 between instruction, source, and result elements means that the instruction element 21 "matched" the source element 22 and "produced" the result element 23.

The mapping relationships make no distinction concerning whether the elements of each set are structured in any way, as trees or lists, for example, or even whether they come from the same source, such as a file. After execution of the process, the mapping, shown as a cloud 30 in FIG. 3, will contain a large number of mapping relationships 31.

Figure 3:
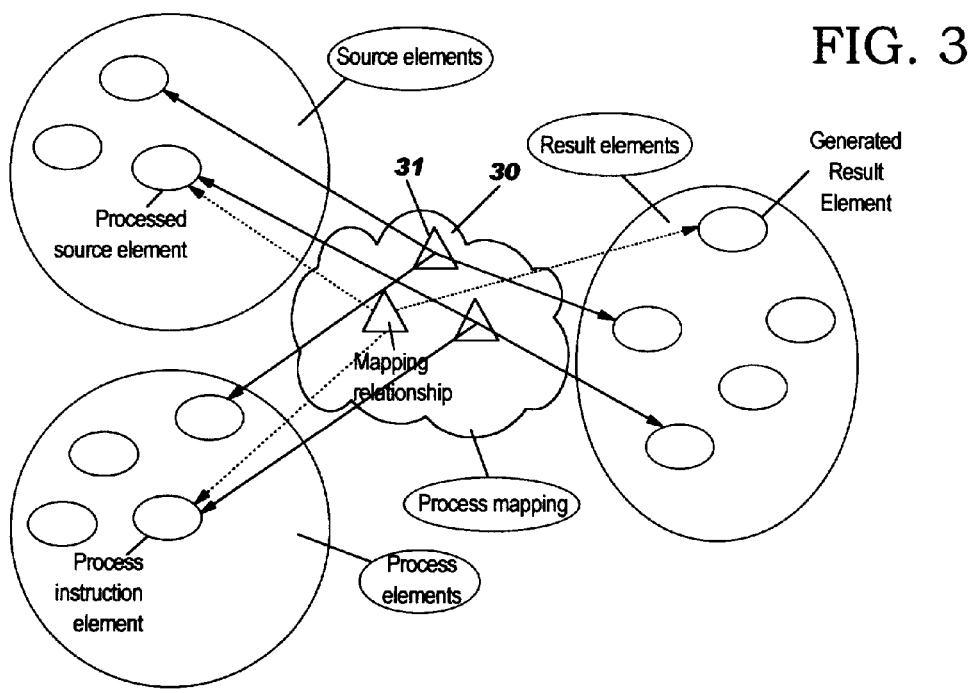

The method of the present invention comprises highlighting the relationships between source, instruction, and result elements. FIG. 3 illustrates displaying mapping relationships defined by a plurality of instruction elements, each said instruction element providing a relation between zero or more source elements, each said instruction elements providing a relation between zero or more source elements and zero or more result elements, wherein each said source element comprises one of a plurality of source elements and each said result element comprises one of a plurality of result elements. Process mapping 31 has three arrows leaving from it that defines this relationship. One arrow goes from process mapping 31 to one and only one result element and that result element is connected only to process mapping 31. A second arrow goes from process mapping 31 to one and only one instruction element and that instruction element is connected only to process mapping 31. A third arrow goes from process mapping 31 to one and only one source element and that source element is connected only to process mapping 31. Thus, FIG. 3 illustrates a relationship between one instruction, one source element and one result element. Furthermore, FIG. 3 illustrates an exemplary embodiment of a relationship between zero source elements, as none of the source elements are linked to the same instruction element.

Figure 4:
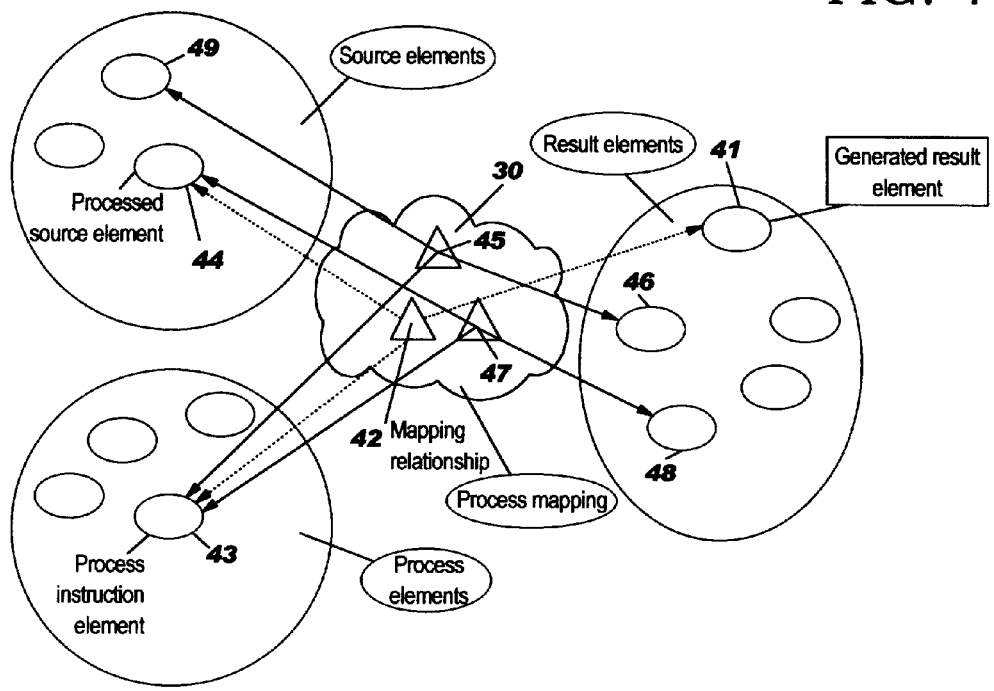

FIG. 4 demonstrates the result of applying this method to the mapping relationship found in FIG. 3. A user selects a result element 41 to initiate the highlighting process. The process applies primary highlighting to element 41, and then propagates primary highlighting as follows.

Result element 41 is traced back through its mapping relationship 42 to find related elements 43 and 44. Primary highlighting is then applied to elements 43 and 44. However, process instruction element 43 is then recognized as actually corresponding to mapping relationships 45 and 47 in addition to 42. Therefore, additional related elements 46, 48 and 49 are recognized. A relationship between two source elements, source elements 44 and 49, is shown in that both source elements are connected to the same instruction element, instruction element 43. Elements 41 and 44 are already highlighted. Secondary highlighting is applied to elements 46, 48, and 49 because of association with process element 43, resulting in primary highlighting of elements 41, 43, and 44, and secondary highlighting of elements 46, 48, and 49 in response to the user having selected generated result element 44.

FIG. 4 also illustrates an exemplary embodiment of an instruction element that provides a relation between zero or more source elements and zero or more result elements. In FIG. 4 there are only three defined mapping relationships, 42, 45, and 47. All three of the mapping relationships are associated with instruction element 43. Therefore, none of the other instruction elements depicted are related to any existing mapping relationships. Thus selecting one of these other instruction elements would result in no relationships being highlighted. In other words, selecting one of the instruction elements other than instruction element 43 would provide a relation between zero source elements and zero result elements.

This example demonstrates a selection as initiated with a result element. A user could have just as well selected source element 44 or instruction element 43, in which case the highlighting process would correspondingly begin with the element selected.

Figure 5:
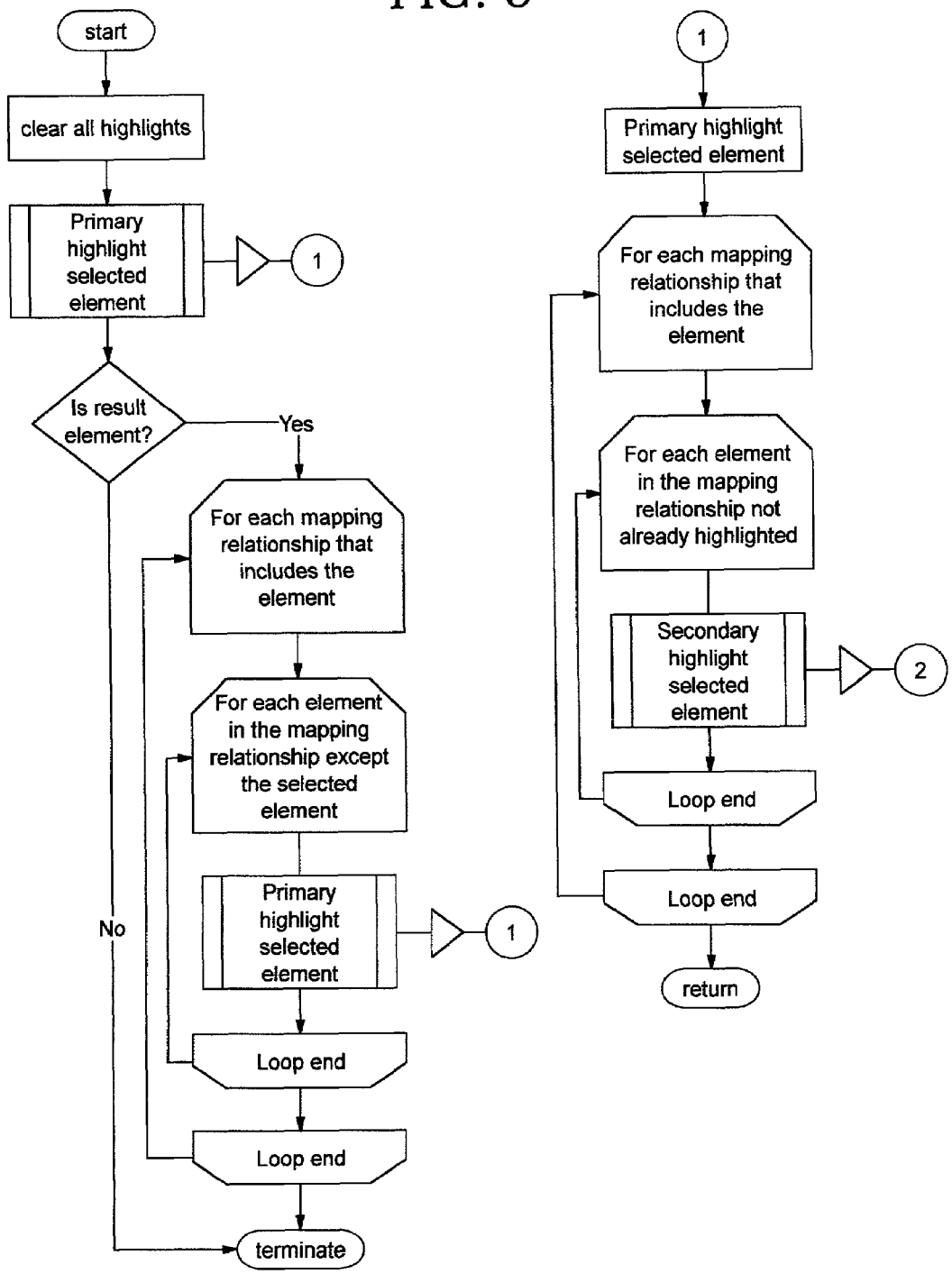
FIGS. 5 and 6 provide a flowchart for an exemplary highlighting algorithm that includes both primary and secondary highlighting.
Figure 6:
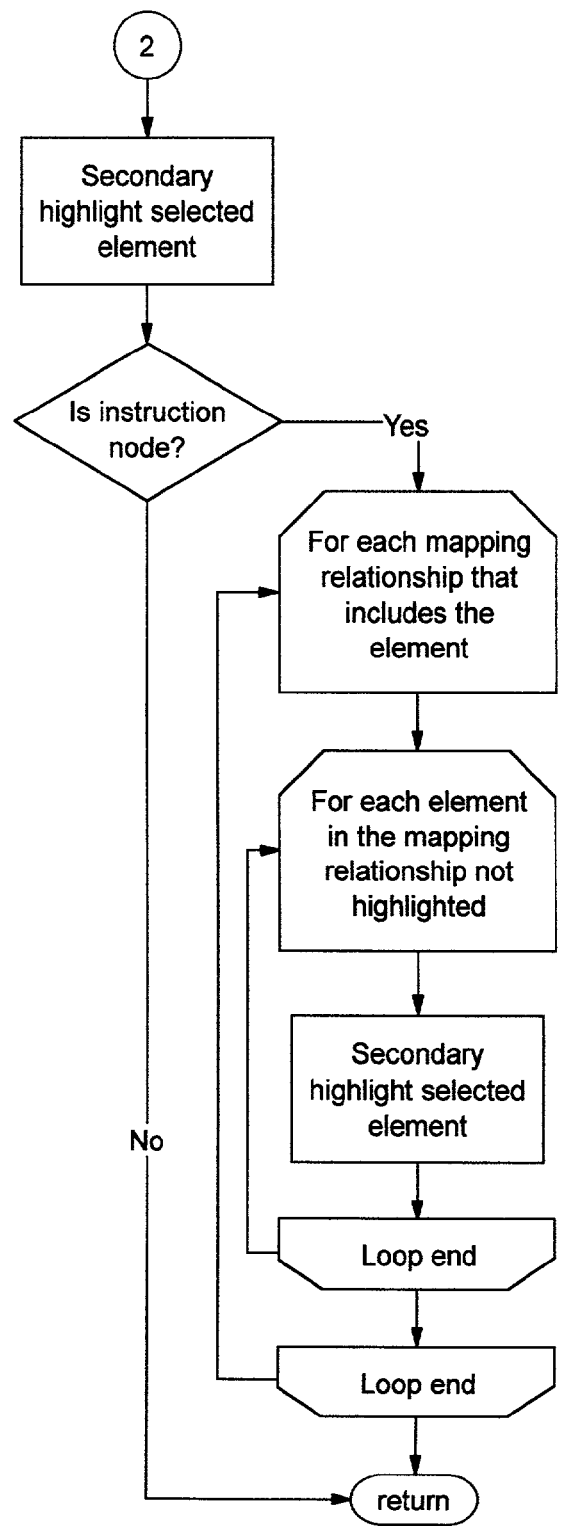

FIGS. 5 and 6 contain flowcharts embodying an exemplary algorithm for achieving the primary and secondary highlighting described above, as follows:

Selection of a result element primary highlights that element, and all elements that participate in a relationship mapping with that element.

Selection of a source or instruction element primary highlights that element.

Primary highlight of any element secondary highlights all elements that participate in a relationship mapping with that element.

Secondary highlight of an instruction element secondary highlights all elements that participate in a mapping relationship with that element.

An element that is primary highlighted cannot be secondary highlighted.

The first step of FIG. 5 to clear all highlights is optional since it may be desirable to allow highlights to accumulate.

Pipelining

The highlighting described herein is not limited to a single process mapping. Sometimes, the processes are pipelined, with the output of one process forming the input for another, as exemplarily illustrated in FIG. 7 and FIG. 8.

Figure 7:
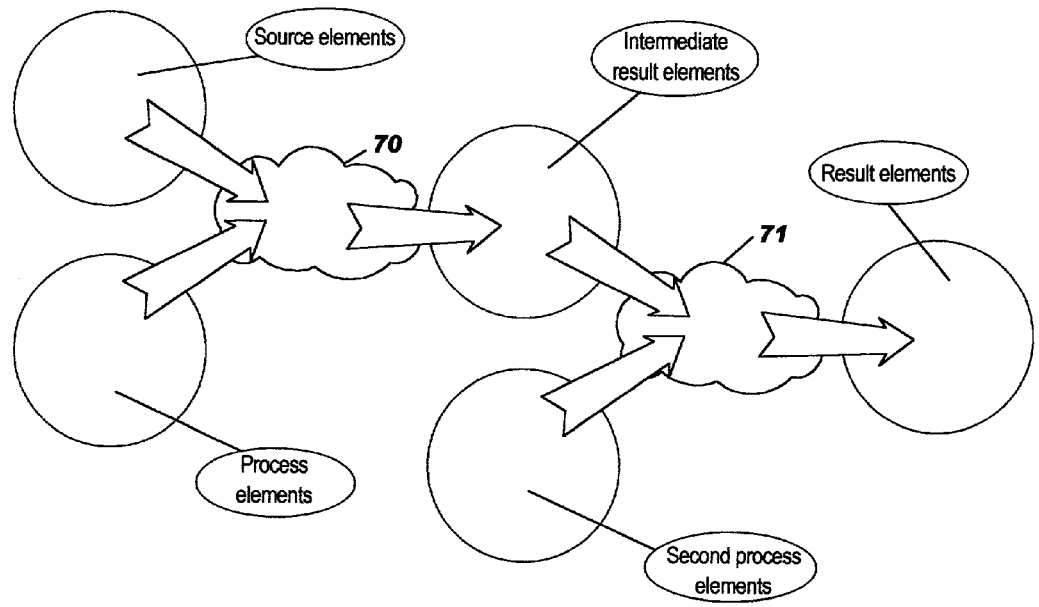
FIGS. 7-9 demonstrate pipelining of process mapping.
Figure 8:
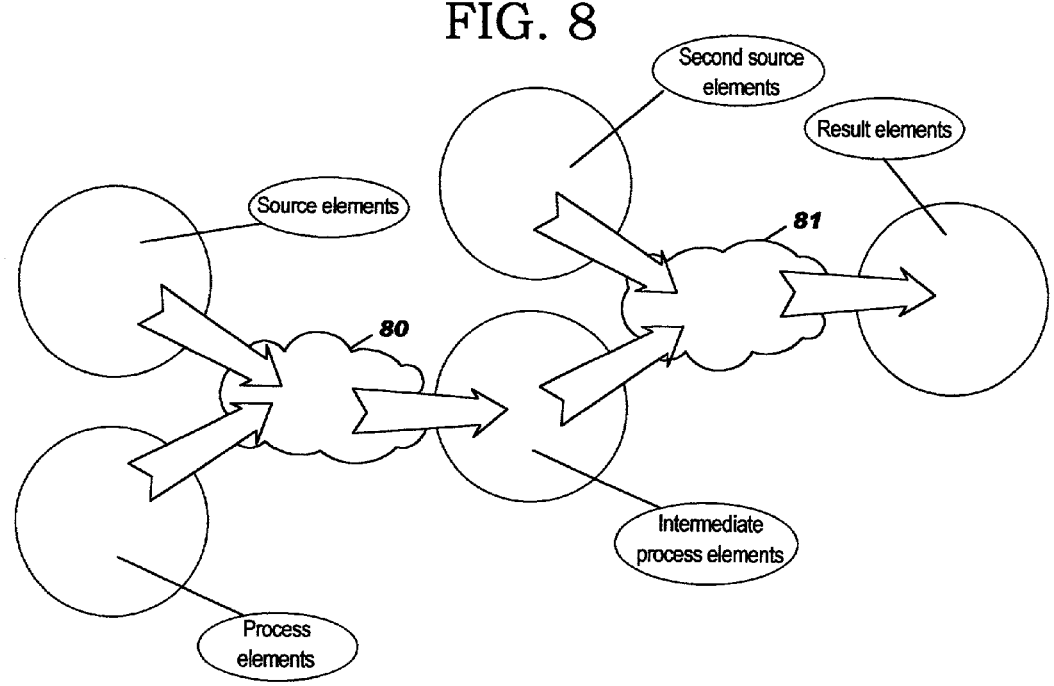

In FIG. 7, the output of the first process 70 becomes input source for the second process 71. In FIG. 8, the output from the first process 80 becomes the input processing instructions for the second process 81.

Figure 9:
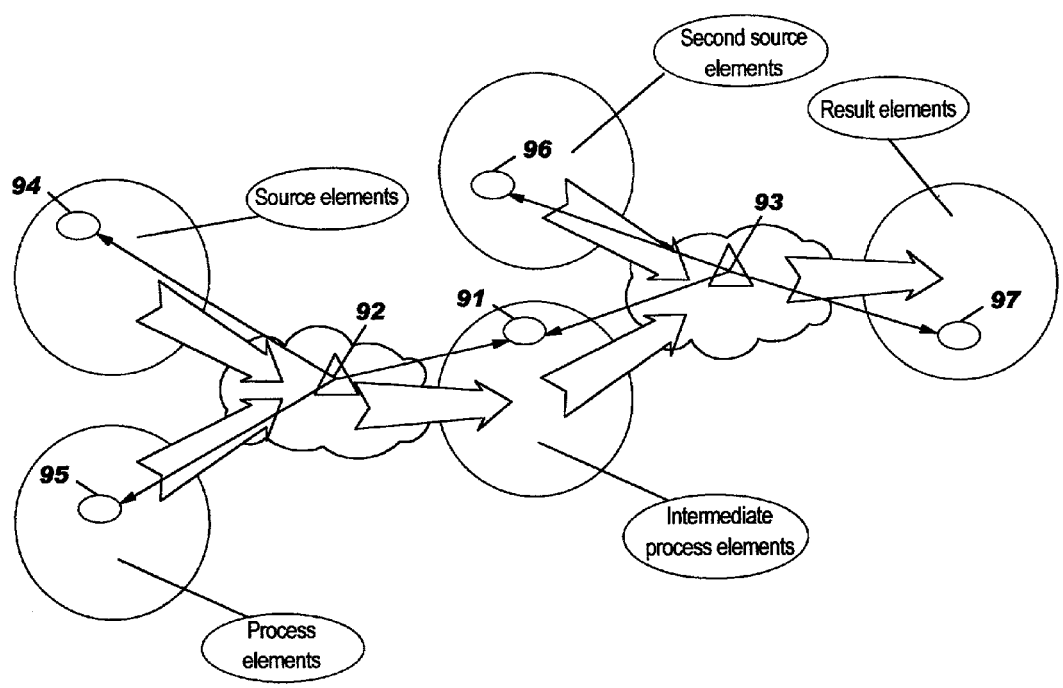

In either case, the algorithm for highlighting does not change. The only difference is that the step of identifying mapping relationships will identify relationships in more than one process mapping. For example, in FIG. 9, element 91 participates in mapping relationships 92, 93, which relate it to elements 94-97.

An Exemplary Embodiment: an XSLT Stylesheet

An XSLT stylesheet transforms source XML to result XML. The structure and content of the result are determined by the source as interpreted, sampled, or elaborated by the stylesheet:

Source-1+Stylesheet⇒Result-1
Source-2+Stylesheet⇒Result-2

An XML contains elements, attributes, and text. A stylesheet contains rules. Rules match elements, attributes, and/or text in the source. When a rule matches, it executes in context of the matched source. It produces some result XML influenced by that context.

XML may be represented as a "tree" of "nodes". Each node of the tree is an element or text. The node at the top of the tree is the "root". All of the nodes connected to the root are the "children" of the root, which is their "parent":

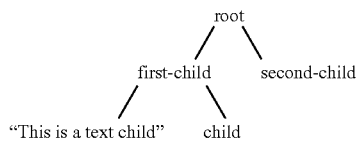

An XSLT stylesheet is itself written as XML. Each rule in the stylesheet is a node in a tree:

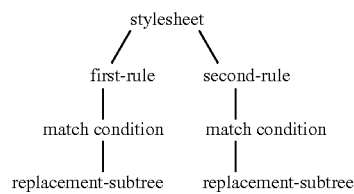

In an XSLT editor developed by the assignee of the present invention, a mapping file is set up to record during execution of a stylesheet all of the matched source node, the stylesheet node of the rule that matched, and result nodes, providing a complete mapping of the relationships on the stylesheet. This XSLT mapping is a straight forward implementation of the concepts demonstrated in FIGS. 1-4 and 7-9. This mapping permits answers to questions such as: which rule(s) was matched a given source node?; and, which result nodes were output from that match?

Figure 10:
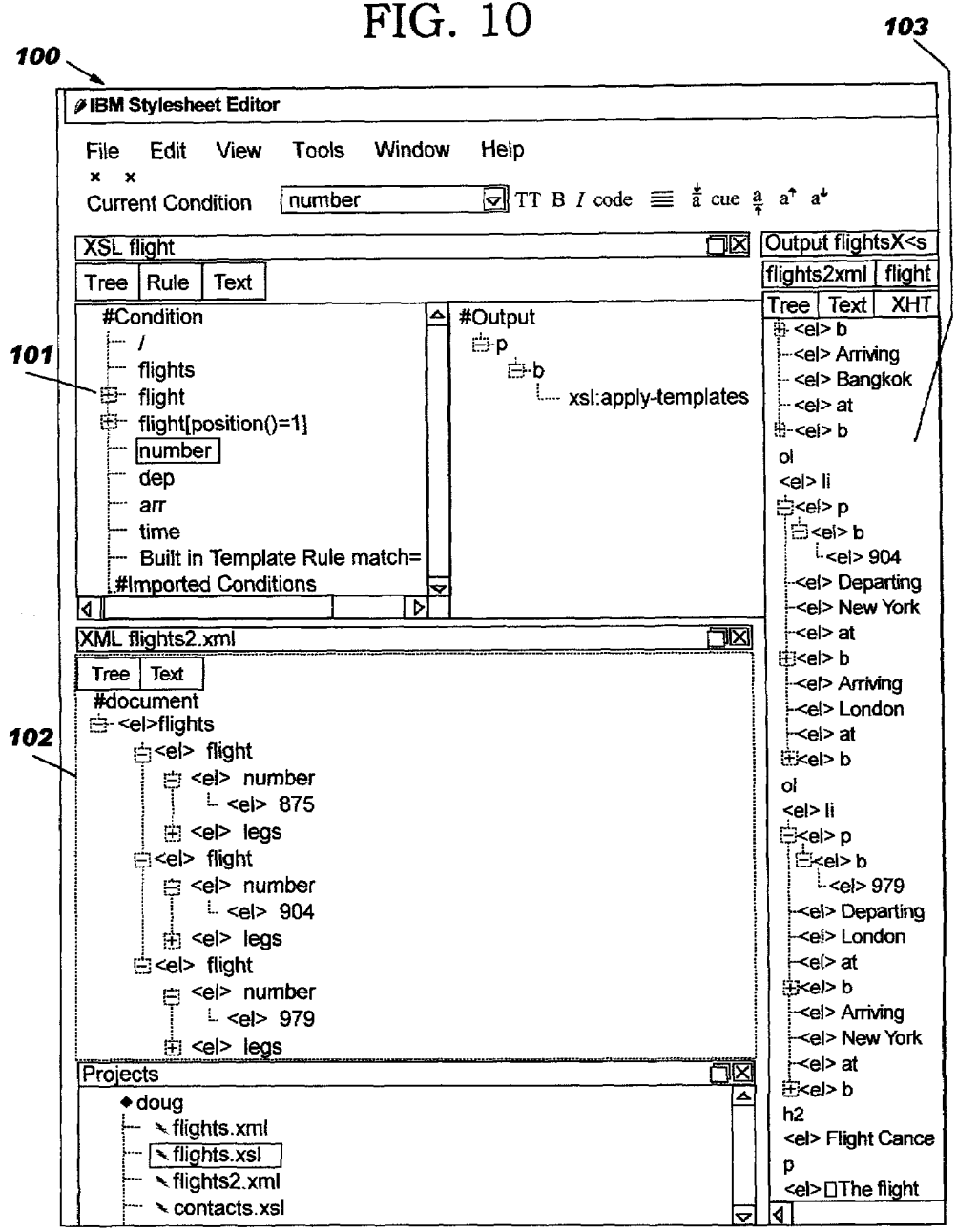
FIG. 10 illustrates one example of a GUI representation of an XSLT editor that exemplarily embodies the methods for highlighting of the present invention.

FIG. 10 shows a sample GUI representation 100 of the XSLT editor showing a stylized presentation 101 of the rules of the stylesheet being edited by the user, a stylized presentation 102 of the XML input source, and a stylized presentation 103 of the XML output that results from the processing of the input source elements by the rules of the stylesheet.

In this embodiment there are two types of selection, "explicit" and "implied", which have a different appearance in the tree views of the editor GUI representation. In the environment of the present invention, the terms "explicit" and "implied" are similar to "primary" and "secondary", respectively, and should be considered equivalent for purpose of this disclosure. The intended distinction is subtle. The first two terms refer to the semantic domain, and the second two terms refer to the visual domain.

A method for selecting a node of any of the trees is provided, for example, by a mouse click. The selected node is highlighted with an explicit selection. The explicit selection clears all previous selections (explicit or implicit), although this step is optional since it might be desirable to allow highlights to accumulate.

The selection is then propagated, as follows:

Selection in the Result:
  Explicit selection of a result node creates an implied selection of the rule node in the stylesheet tree that produced the selected result node.
  Implied selection of a result node does not propagate.

Selection in the Stylesheet:
  Explicit selection of a stylesheet node creates:
    an implied selection of all result nodes generated by the selected rule, and
    an implied selection of all source nodes matched by the selected rule.
  Implied selection of a stylesheet node creates:
    an implied selection of all result nodes generated by the selected rule, and
    an implied selection of all source nodes matched by the selected rule.

Selection in the Source:
  Explicit selection of a source node creates an implied selection of all rules that matched the selected node.
  Implied selection of a source node does not propagate.

In all cases, propagation of implicit selection does not alter the explicit selection, or, stated differently, a node that is both explicitly and implicitly selected appears explicitly selected. Selection highlights the relationships of source, stylesheet, and result XML generated by the transformation of the source by the stylesheet.

Propagation Through Pipelines of Stylesheets

It is more and more common that XSL Transforms may be pipelined such that the output of one transform is the input to another.

Source-1 + Stylesheet-1 ==> Intermediate + Stylesheet-2 ==> Result-2
|_____Transform-1_____|
                                |_____Transform-2_____|

The present invention propagates selections along the chain by treating a selection in Intermediate as a selection of the result of Transform-1 and of the source of Transform-2.

Propagation Through Stylesheets that Produce Stylesheets

It is less common, but sometimes arranged that the result of a transform may itself be a stylesheet which is in turn applied to a different source.

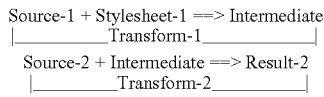

```
        <illustration of s2s>
Source-1 + Stylesheet-1 ==> Intermediate
|_____Transform-1_____|
   Source-2 + Intermediate ==> Result-2
   |_____Transform-2_____|
```

The present invention propagates selections by treating a selection in Intermediate as a selection of the result of Transform-1 and of the stylesheet of Transform-2.

The method of the present invention can apply not only to XSLT execution, but to any non-recursive transformation process. Neither must it necessarily be limited to tree transformations. The input and output may have any structure. The method may apply, for example, to the execution of awk scripts in which a record-oriented input is matched to produce text output.

Figure 11:
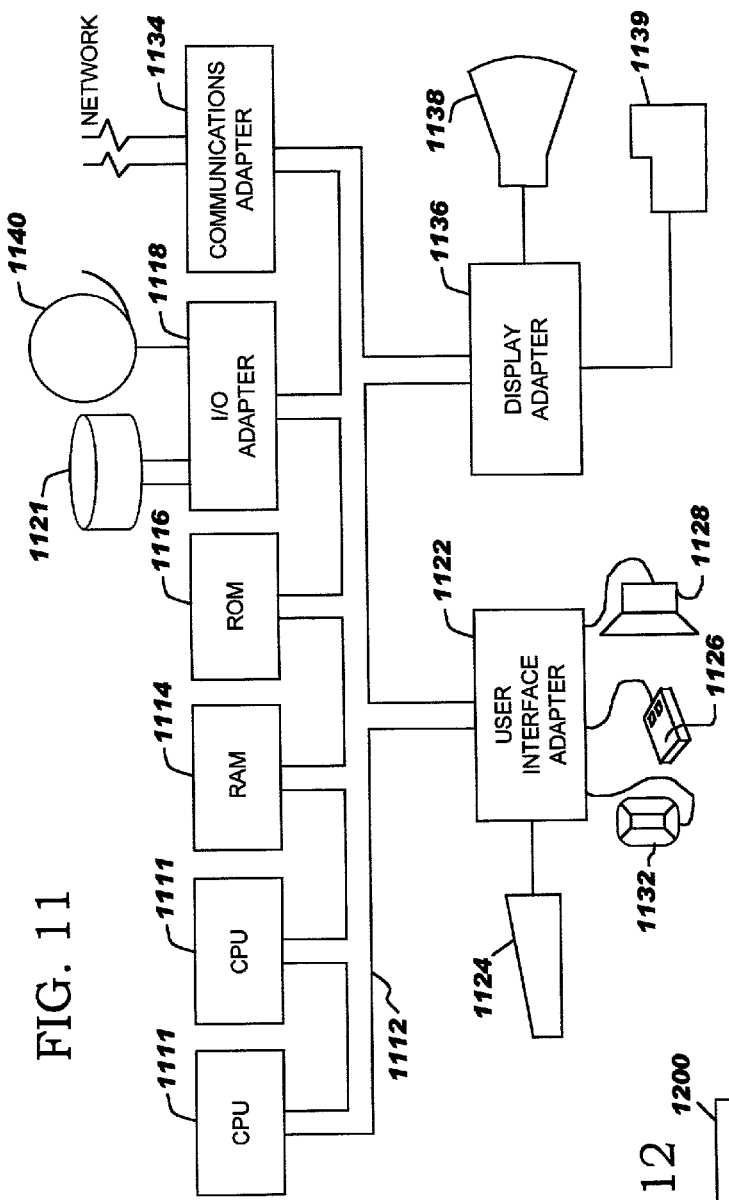
FIG. 11 illustrates an exemplary hardware/information handling system 1100 for incorporating the present invention therein.

FIG. 11 illustrates a typical hardware configuration of an information handling/computer system which can be used with the invention and which preferably has at least one processor or central processing unit (CPU) 1111.

The CPUs 1111 are interconnected via a system bus 1112 to a random access memory (RAM) 1114, read-only memory (ROM) 1116, input/output (I/O) adapter 1118 (for connecting peripheral devices such as disk units 1121 and tape drives 1140 to the bus 1112), user interface adapter 1122 (for connecting a keyboard 1124, mouse 1126, speaker 1128, microphone 1132, and/or other user interface device to the bus 1112), a communication adapter 1134 for connecting an information handling system to a data processing network, the Internet, an Intranet, a personal area network (PAN), etc., and a display adapter 1136 for connecting the bus 1112 to a display device 1138 and/or printer 1139 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 1111 and hardware above, to perform the method of the invention.

Figure 12:
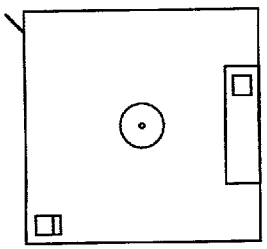
FIG. 12 illustrates a signal bearing medium 1200 (e.g., storage medium) for storing steps of a program of a method according to the present invention.

This signal-bearing media may include, for example, a RAM contained within the CPU 1111, as represented by the fast-access storage for example. Alternatively, the instructions may be contained in another signal-bearing media, such as a magnetic data storage diskette 1200 (FIG. 12), directly or indirectly accessible by the CPU 1111.

Whether contained in the diskette 1200, the computer/CPU 1111, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A computer implemented method of displaying mapping relationships, wherein each said mapping relationship maps a result element, a source element and an instruction element that are related to each other and a display of said mapping relationships comprising a plurality of result elements, a plurality of source elements and a plurality of instruction elements, said mapping relationships defined by a plurality of instruction elements, said method comprising:

providing a representation comprising a portion of said mapping relationships and including at least one of said plurality of source elements, said plurality of instruction elements, and said plurality of result elements;

responsive to selecting one of said result elements in said representation, forming a selected result element, primary highlighting said selected result element in said representation, wherein the primary highlighting indicates elements that are directly related to said selected result element; and responsive to said selected result element being primary highlighted, automatically highlighting other elements related by one of said mapping relationships that are displayed in said representation, wherein the automatically highlighting step comprises:

primary highlighting a source element and an instruction element that is directly related to said selected result element by the one of said mapping relationships as defined in the mapping relationship corresponding to said selected result element, forming a directly related source element and a directly related instruction element;

responsive to primary highlighting the directly related instruction element, secondary highlighting other source elements and result elements that are related to the directly related instruction element, as defined in other said mapping relationships associated with the directly related instruction element, wherein the secondary highlighting indicates elements that are related to the source elements and the instruction elements that are directly related to said selected result element by the other said mapping relationships; and wherein said plurality of instruction elements comprises an XSLT (eXtensible Style Language Transformations) stylesheet, said plurality of source elements comprises XML (eXtensible Markup Language) source elements, and said plurality of results elements comprises XML result elements.

2. The computer implemented method of claim 1, further comprising:

providing an input to cause an execution of a transformation process that defines said mapping relationships, said input causing said source elements to become an input into at least one of said instruction elements to produce at least one of said result elements.

3. The computer implemented method of claim 2, further comprising:
- establishing a mapping file providing a correspondence between said plurality of source elements, said plurality of instruction elements, and said plurality of result elements, based upon said source elements having been processed by said plurality of instruction elements in said transformation process.

4. The computer implemented method of claim 3, wherein automatically highlighting further comprises:
- determining from said mapping file which of said source elements, said instruction elements match the at least one of said source elements, and which of said result elements are outputs of the matching correspond to said selected element; and
- secondary highlighting the at least one of said source elements and any of said corresponding instruction elements that match the at least one of said source elements currently visible on said representation, said representation being user-controlled.

5. The computer implemented method of claim 4, further comprising:
- providing a user an input as a command to request said determination to occur.

* * * * *